US006926233B1

(12) United States Patent
Corcoran, III

(10) Patent No.: US 6,926,233 B1
(45) Date of Patent: Aug. 9, 2005

(54) AUTOMATIC FORMATION FLIGHT CONTROL SYSTEM (AFFCS)—A SYSTEM FOR AUTOMATIC FORMATION FLIGHT CONTROL OF VEHICLES NOT LIMITED TO AIRCRAFT, HELICOPTERS, OR SPACE PLATFORMS

(76) Inventor: James John Corcoran, III, 12258 N. 120th St., Scottsdale, AZ (US) 85259

( * ) Notice: Subject to any disclaimer, the term of this patent is extended or adjusted under 35 U.S.C. 154(b) by 82 days.

(21) Appl. No.: 10/784,660

(22) Filed: Feb. 21, 2004

(51) Int. Cl.$^7$ .............................. B64C 3/00; B64C 9/00
(52) U.S. Cl. ..................................................... 244/76 R
(58) Field of Search ........................... 244/75 R, 76 R, 244/189, 96, 175

(56) References Cited

U.S. PATENT DOCUMENTS

| | | | |
|---|---|---|---|
| 4,674,710 A | * | 6/1987 | Rodriguez ................. 244/76 R |
| 5,521,817 A | * | 5/1996 | Burdoin et al. ................. 701/3 |
| 5,531,402 A | * | 7/1996 | Dahl ......................... 244/75 R |
| 6,587,757 B2 | * | 7/2003 | Sainthuile ...................... 701/1 |
| 6,641,082 B2 | * | 11/2003 | Bevilaqua et al. ............. 244/2 |

* cited by examiner

Primary Examiner—Teri Pham Luu
Assistant Examiner—Stephen A. Holzen

(57) ABSTRACT

A totally integrated system for automatic formation flight control of multiple vehicles not limited to aircraft, helicopters, or space platforms. For instance, the system may be used to control any number of aircraft in a pre-determined flight formation and provide "positive" identification, control and discrete communications between any number of vehicles. Thus the invention prevents mid-air collisions between vehicles in formation flight. The system generally includes a processor located on the vehicles to enable communications, unique position computations and control messaging between any number of aircraft in formation flight, a communications transceiver located on the vehicle that provides discrete communication links to any number of aircraft in formation flight an autopilot and a display. The processor may take into consideration velocity, direction, winds aloft, wing tip clearance of any number of vehicles. On aircraft, the system will display the current formation and vehicles relative position under control by this invention. The system may be overridden in flight.

2 Claims, 3 Drawing Sheets

AFFCS Functional Block Diagram

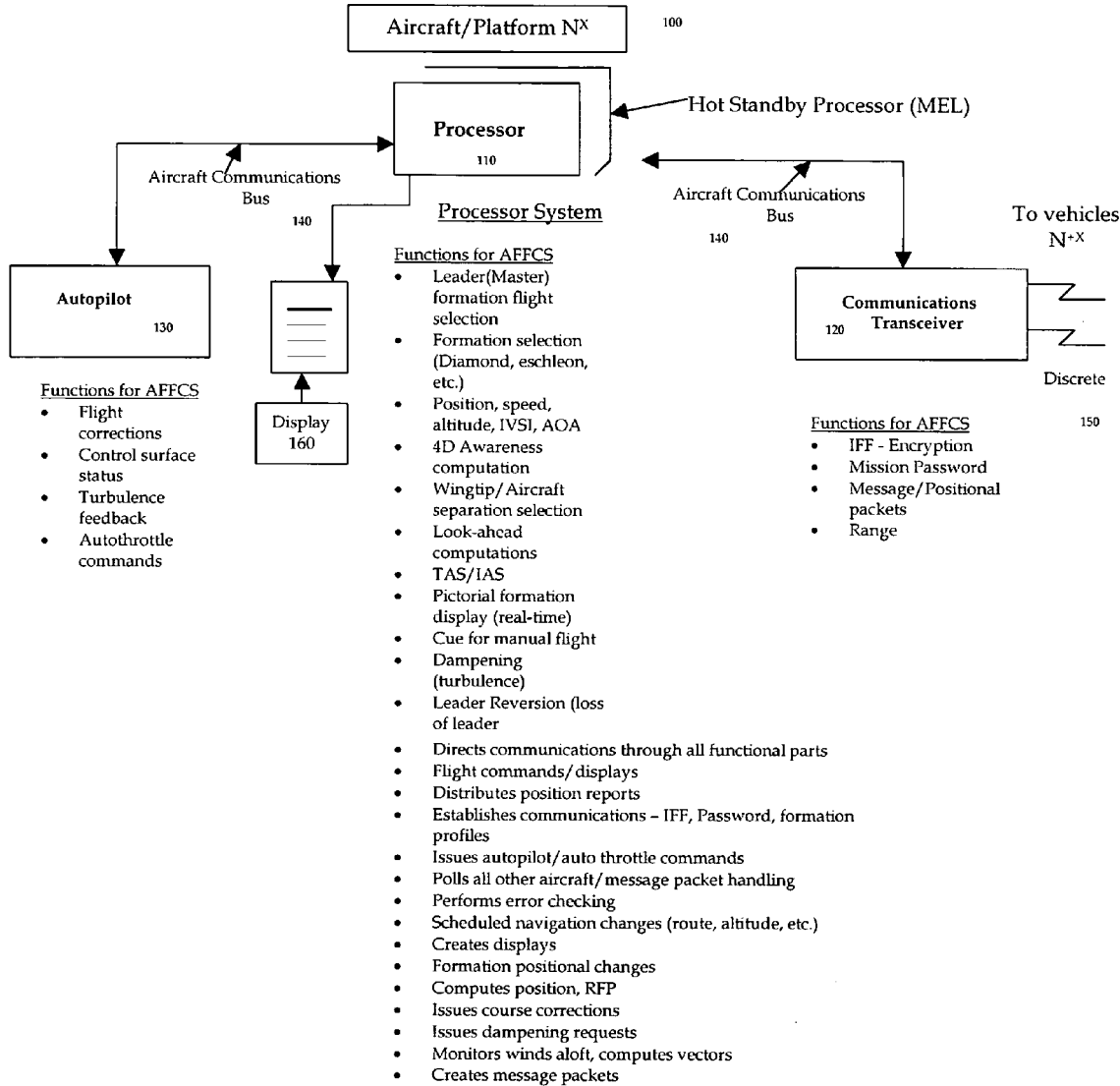
AFFCS Functional Block Diagram – Figure 1

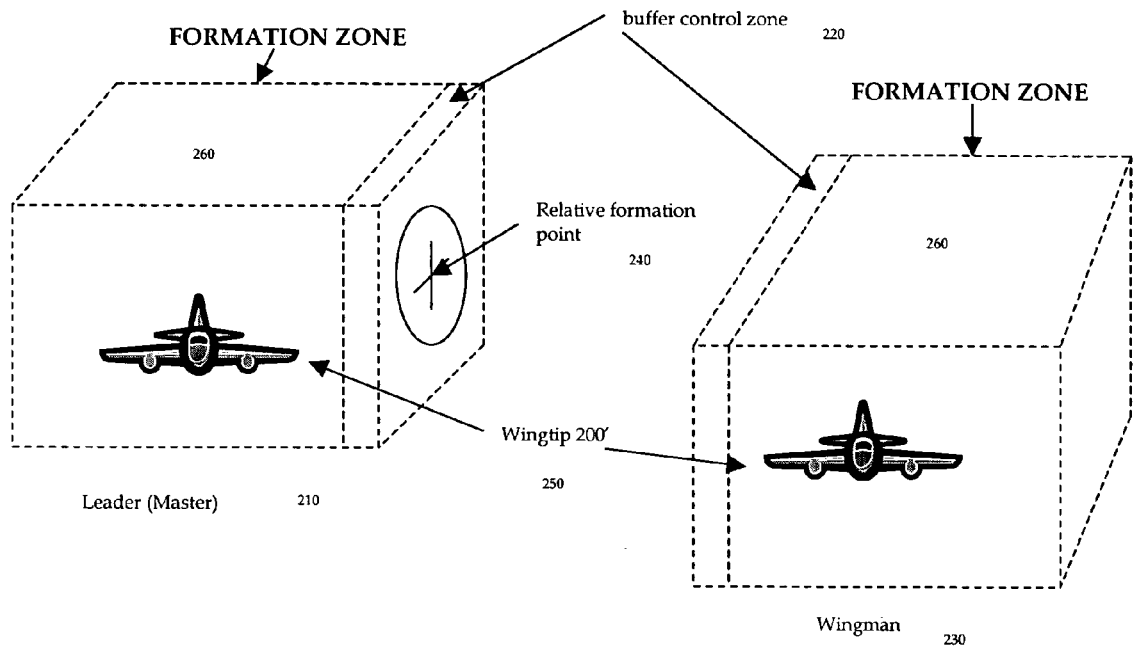
AFFCS -Formation Zone Geometry - Figure 2

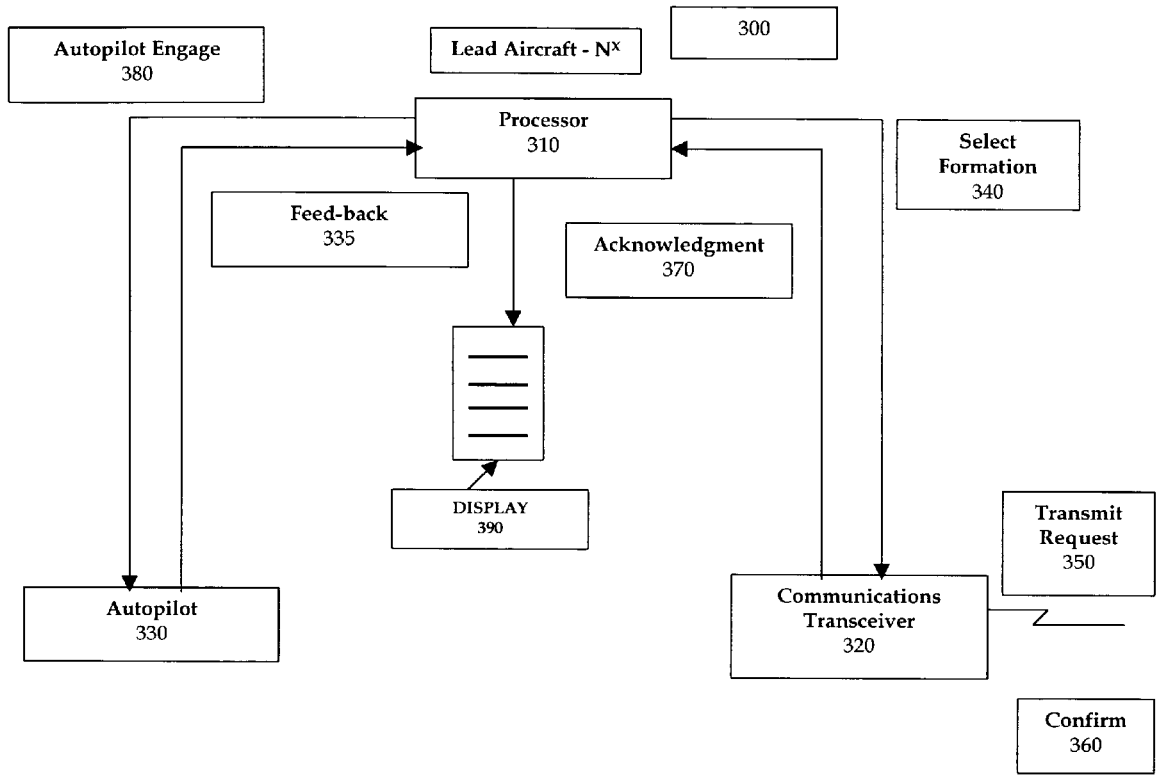

AUTOMATIC FORMATION FLIGHT CONTROL SYSTEM (AFFCS)—A SYSTEM FOR AUTOMATIC FORMATION FLIGHT CONTROL OF VEHICLES NOT LIMITED TO AIRCRAFT, HELICOPTERS, OR SPACE PLATFORMS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of transportation and more specifically to a system for automatic formation flight control of vehicles not limited to commercial or military aircraft, helicopters, or space platforms.

Formation flight has always been the cornerstone of both precision flight and mission execution. Presenting one radar image, size or surprise has always been a key to military success. As the regimes of speed have increased, the requirement for a more positive control of these kinds of formations has been a request by planners for various missions and by the pilots as well. Technology has now progressed to a point where the integration of various functions can be accomplished without significant hardware and computing power allows for software to execute the required controls to include position, clearance and flight planning more efficiently and quickly than under manual control. The removal of error in the global positioning satellite constellation and the significant lack of this error in military operations now opens the door for this kind of a totally integrated system.

The existence of autopilots and voice communications have been utilized for this type of a military requirement for many years. Weather, turbulence and speed have contributed to accidents with deaths even under the best of circumstances. A new era of formation flight is upon us.

Delays inherent in voice communications coupled with reaction times have prevented a precise execution of formation flight up to this point in time. With the advent of high-speed data communications, man/machine interface improvements and positive flight control capabilities, it is time for the next step with a totally integrated automatic flight formation control system.

BRIEF SUMMARY OF THE INVENTION

The primary advantage of the invention is to provide discrete, precise, positive control between any number of aircraft in formation flight.

Another advantage of the invention is to provide discrete navigational, positional and performance control to any number of aircraft in formation flight.

A further advantage of the invention is to provide discrete look-ahead computation for any number of aircraft in formation flight.

And yet another object is to provide discrete formation displays for cockpit reference for any number of aircraft in formation flight.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, what is claimed is: A totally integrated system for automatic formation flight control of multiple vehicles not limited to aircraft, helicopters, or space platforms said system comprising of: an automatic flight control system with processor located on the vehicle to enable communications and control to any number of aircraft in formation flight, a communications transceiver located on the vehicle that provides discrete communication links to any number of aircraft in formation flight, a aircraft communications bus protocol and message packet structure that provides exchange of information from multiple aircraft in formation flight, an encrypted method of communications exchange between any number of aircraft in formation flight, a method of providing a computed "formation zone" (FZ) that provides elemental positional information for multiple aircraft in formation flight, this may be a box or sphere whose volume is calculated to present a "formation zone" (FZ), a method of selecting both formation flight pattern and spatial clearance between multiple aircraft in formation flight, a method of providing "real-time" display of aircraft and positions of multiple aircraft in formation flight, a method of providing a "buffer zone" with a "relative formation point" (RFP) for any number of aircraft in formation flight, a method of polling all aircraft in formation flight for positional information, a method of providing flight guidance including autopilot inputs to multiple aircraft in formation flight, a method of providing "dampening" of the flight profile to multiple aircraft in formation flight, a totally integrated system to provide control of any number of aircraft in formation flight, and an autopilot located on the vehicle capable of receiving and transmitting inputs/outputs from the vehicle communications bus.

In accordance with a preferred embodiment of the invention, there is disclosed a process for automatic formation flight control of vehicles as claimed in claim 1 not limited to aircraft, helicopters, or space platforms further comprising the steps of: a flight control system with processor located on the vehicle according to claim 1, said processor to enable communications and control to any number of aircraft in formation flight and calculate the formation zone (FZ) and (RFP) relative formation point and initiate exchange of similar information between multiple vehicles in order to prevent mid-air collision of multiple vehicles under AFFCS control. A communications transceiver located on the vehicle that provides discrete communication links to any number of aircraft in formation flight, a aircraft communications bus protocol and message packet structure that provides exchange of information from multiple aircraft in formation flight, an encrypted method of communications exchange between any number of aircraft in formation flight, a method of providing a computed "formation zone" (FZ) that provides elemental positional information for multiple aircraft in formation flight, to be comprised of speed (IAS), position (Latitude and Longitude provided by GPS), altitude provided by radio altimeter correlated with pressure altimeter plus predetermined distance from wing tip of formation vehicle and a "buffer zone" with the RFP calculated being comprised of a composite of the nearest four corners of the FZ and the center point of the FZ (FIG. 2). A method of selecting both formation flight pattern and spatial clearance between any number of aircraft in formation flight, a method of providing "real-time" display of aircraft and positions of multiple aircraft in formation flight, a method of providing a "buffer zone" with a "relative formation point" (RFP) for each aircraft in formation flight, a method of polling all aircraft in formation flight for positional information, a method of providing flight guidance including autopilot inputs to any number of aircraft in formation flight, a method of providing "dampening" of the flight profile to multiple aircraft in formation flight, a totally integrated system to provide control of any number of aircraft in formation flight, and an autopilot located on the vehicle capable of receiving inputs from the vehicle communications bus.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a functional block diagram of the Automatic Formation Flight Control System (AFFCS). It demonstrates the integration of the various parts of the system and the integration of the processes.

FIG. 2 is a geometric representation of the Formation Zone (FZ) and the Relative Formation Point (RFP).

FIG. 3 is a flow chart illustrating just one of the functions of the AFFCS that is, Initiation of Formation.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

DETAILED DESCRIPTION OF THE EXEMPLARY EMBODIMENTS

The present invention provides a system, method and process for automatic formation flight control for use in either a commercial or military flight application, helicopter and space vehicles. It is used to avoid mid-air collisions during formation flight and provide guidance to vehicles requiring close maneuvering in flight regimes, orbital flight and maneuvering as part of some of the exemplary embodiments. For instance, as illustrated in FIG. 2, the system may be used to initiate automatic formation flight control by aircraft 210 that aircraft 210 has entered the correct formation selection, IFF code and password to initiate communications with aircraft 230 on which resides as illustrated in FIG. 1, processor 110, communications transceiver 120 and autopilot 130 with an aircraft communications bus 140. As conceptually illustrated in FIG. 1, the system generally includes a processor 110, a communications transceiver 120, an autopilot 130 and a communications bus 140 all of which are located on the vehicle (e.g. on aircraft 210 and 230 in FIG. 2 or aircraft 100 in FIG. 1). Thus the exemplary embodiment of which is illustrated in FIG. 1 might include aircraft 100 plus others in the formation with the same capability.

As an overview, automatic formation flight control system 110 initiates the formation communications with N+X aircraft in the formation and repeatedly interrogates the other systems as well as each other individually as to the position in the FZ (formation zone) 260 as illustrated in FIG. 2 with a computation of RFP (relative formation point) 240 as illustrated in FIG. 2. This is a composite of airspeed, IAS (indicated airspeed), position as known through GPS (global positioning calculations), look ahead calculations to include turbulence and winds aloft at the current altitude and wingtip clearance selection 250 as illustrated in FIG. 2. The system includes an automatic reversion function if the flight leader is loss due to either a mechanical or action related event.

An automatic formation flight control system according to the present invention may be a system installed on a vehicle, or may include the vehicle itself or other vehicles. In any case, the present invention may require additional hardware, or may be constructed, all or in part, using hardware already installed on the vehicle, e.g. for other purposes. In some embodiments, such as illustrated in FIG. 2, the vehicle is a flight of two aircraft (e.g. 210 and 230). However, the vehicle may be another type of vehicle such as a helicopter or a space vehicle or platform. In addition, in other embodiments, the vehicle may be a orbiting space platform in which there is a landing or docking zone that requires a synchronizing of flight paths to match velocity, position and axial movement, a group of unmanned remote piloted vehicles, or generally any other vehicle configured to move in a controlled formation.

Referring to FIG. 2, a formation selection of a "flight of two", results in the leader 210 initiating the formation with the appropriate IFF (identification friend or foe) code along with the password for this mission with the wingman 230 and the associated system on that aircraft. Upon receiving the correct acknowledgment FIG. 3 (transaction process initiation of formation request), the automatic formation flight control system (AFFCS) begins to poll the other aircraft for the data required such as the FZ 260 (formation zone) calculations and the RFP 220 (relative formation point) as illustrated in FIG. 2 in addition to the display of the formation on the display as part of the processor system 110 as illustrated in FIG. 1. Course, speed, altitude, turbulence and look ahead flight plan corrections are then shared and sent to the respective autopilot and/or autothrottle to alter the course to prevent a mid-air collision. Any navigational procedures can be utilized as part of the AFFCS system to control a mission profile (e.g. a joint bombing run on a target). Although described herein as being separate systems or components, as would be understood by a person skilled in the art, conceptual components described herein of these and other systems may be combined in the same equipment or may be part of other systems or equipment unrelated to the present invention.

A formation zone (FZ) 260 as illustrated in FIG. 2 is generally an area of spatial interest, which locates a vehicle controlled by an AFFCS system. It may be comprised of the computed RFP closest to next aircraft, a computed volume or protected FZ around the vehicle and may also be comprised of a box or sphere.

The data would include position as determined by GPS (global positioning), TAS (true airspeed), IAS (indicated airspeed), altitude, radar altimeter, IVSI (instantaneous vertical speed indicator), wingtip clearance selection, look ahead trending (turbulence and/or weather) and the creation of a six sided box or sphere around the vehicle with calculated corners or volume and RFP 240 (relative formation point) as illustrated in FIG. 2. Multiple RFP's may be created as required by the formation selection, which might include vehicles above, and below the leader 210. This results in the creation of a spatial relationship between the vehicles and the ability then to display the formation under AFFCS control on the displays in each of the vehicles. In many embodiments, the formation zones (FZ) 260 are particular calculated spatial areas relative to the other vehicles also calculated formation zones. However, the formation zone in accordance with the present invention may be defined relative to other references or coordinate systems provided the calculation systems (processor 110) are capable of providing information relative to those references or coordinate systems, or that can be converted to such.

The processor system 110 is typically located on the vehicles that are participating in controlled formation flight and provides the input and output to the autopilot 130, the communications transceiver 120, the display 160 and via message packets data to other vehicles (N+X) under control of AFFCS. Processor 110 may be a computer or computer processor, typically capable of performing operations and manipulating data. As illustrated in FIG. 1, processor 110 receives information from various inputs such as GPS, IVSI, radar altimeter, IAS, TAS, pressure altimeter, wingtip clearance selection, formation selection and calculates the FZ 260 and RFP 240 for the vehicle. The processor then creates a message packet to be sent to the other vehicles under AFFCS control so that they can monitor and update their individual displays, relative positions and clearance requirements. The processor 110 also receives message packets from the other vehicles and uses that data to determine the display parameters for display 160 and trend analysis for the entire flight formation. Processor 110 is configured to initiate, or provide controlling input to, the autopilot 130, the processor on vehicles under AFFCS control, and the occupants of the vehicle, such as the pilot or similar flight officer. Processor 110 may have other responsibilities or be part of another system such as, for example, a navigation computer, a control system, or a flight management system (FMS). Processor 110 may be programmed in a computer language such as C++, typically in ways familiar to a person skilled in the art of programming.

For example, processor 110 may be programmed or configured to calculate the FZ 260 and the RFP 240 and initiate formation flight control to multiple vehicles participating through the unique IFF and mission password. The leader 210 as illustrated in FIG. 2 has the main authority for the formation. Processor 110 may be programmed to continuous calculations of spatial position and share this information via message packets with the other vehicles processors in a coordinated manner so as to avoid conflicts and mid-air collisions.

In the more complex embodiments, processor 110 may be configured to take into consideration the motion, relative position; spatial trends as affected by winds aloft and weather. Processor 110 may then suggest adjustments in the formation profile and pass this information along to the other vehicles so that a uniform formation clearance is maintained. The amount of adjustment, for instance, may be proportional, or otherwise related to, the speed, position, altitude, FZ 260, buffer control zone 220 (which takes into account the wingtip clearance selection and trend analysis) and recommended to the leader vehicle via autopilot and autothrottle plus also statused to the other vehicles in the formation for update or action. Processor 110 may utilized display color change (e.g. from blue to yellow) to highlight a potential conflict in the formation flight in order to alert the pilot or pilots to a future possible conflict. Processor 110 will recommend actions and immediately react to the trend if it determines that it has the potential of creating a mid-air situation by directing the autopilot or autothrottle 130 to move the control surfaces in a manner that eliminates the conflict or increase or reduce speed via the autothrottles to place the vehicle in conformance with the overall formation. This action is typical throughout the entire embodiment of this invention.

Referring to the embodiment in FIG. 2, the automatic formation flight control system provides the means to reduce mid-air collisions during close formation flight regimes which at current speeds and maneuverability capabilities exceed the man/machine interface and require, especially in coordinated flight maneuvers (e.g. bombing missions), accurate control of the entire formation. This is especially critical in low visibility or night operations where the elements of stealth or surprise are important to the mission success.

In embodiments on aircraft, such as aircraft 210 in FIG. 2, existing systems on the aircraft may provide most of the hardware required. For instance, the FMS may perform the processing, communications; positioning, input/output processing and the CDU may provide the visual display. In some embodiments only wiring and software changes may be required. For instance, a FZ, RFP and buffer zone algorithm may be required.

FIG. 3 illustrates a method according to the present invention. The method is one of many which is used by the processor 310 to establish and maintain communications and thereby control of a flight formation under AFFCS. Typically, the vehicle occupants or pilots begin the AFFCS operation by selecting the formation 340, entering the IFF and mission password on the processor 310, it then creates a message packet to send to the other vehicle 350 via the communications transceiver 320, it is received and confirmed by the other vehicles 360, it is then acknowledged 370 in the processor and the autopilot engage command is sent 380 to the autopilot 330 and the formation is displayed on 390. Feedback is provided 335 to the processor 310 to assist in calculating turbulence dampening requirements for the formation.

Likewise all previous actions described in detail within these specifications are acted upon by the processor in similar manner.

In the foregoing specification, the invention has been described with reference to specific exemplary embodiments. However, one of ordinary skill in the art appreciates that various modifications and changes can be made without departing from the scope of the present invention as set forth in the claims below. Accordingly, the specification and figures are to be regarded in an illustrative rather than a restrictive sense and all such modifications are intended to be included within the scope of the present invention. In addition, benefits, other advantages, and solutions to problems, and any element(s) what may cause any benefit, advantage, or solution to occur or become more pronounced are not to be construed as critical, required, or essential feature or element of any or all the claims. As used herein, the terms "comprises", "Comprising", or any other variation thereof are intended to cover non-exclusive inclusion, such that a process, method, article, or apparatus that comprises a list of elements does not include only those elements but may include other elements not expressly listed or inherent to such process, method, article, or apparatus.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A totally integrated system for automatic formation of flight control for vehicles, said system comprising:

an automatic flight control system having a processor located on the vehicle to enable communications and control of any number of aircraft in a formation, a communications transceiver located on the vehicle that provides discrete communication links to the number of aircraft in formation, an aircraft communications bus protocol and message packet structure that provides an exchange of information between the number of aircraft in formation, a means for encrypting communications exchange between any number of aircraft in formation, a means for providing a computed formation zone that provides elemental positional information for the number of aircraft in formation;

a means for selecting both formation flight pattern and spatial clearance between the number of aircraft in formation flight, a means for providing real-time display of aircraft and positions of the number of aircraft in formation, a means for providing a buffer zone with a relative formation point for any number of aircraft in formation, a means for polling the number of aircraft in formation for positional information, a means for providing flight guidance including an autopilot inputs to the number of aircraft in formation;

a means for providing a dampening of the flight profile to the number of aircraft in formation, and an autopilot located on the vehicle, capable of receiving and transmitting inputs or outputs from the vehicle communications bus.

2. A process for automatic formation flight control of vehicles comprising a flight control system with processor located on the vehicle, said processor enables communications and controls to any number of aircraft in formation flight and calculates the formation zone (FZ) and (RFP) relative formation point and initiate exchange of similar information between multiple vehicles in order to prevent mid-air collision of multiple vehicles under AFFCS control, a communications transceiver located on the vehicle that provides discrete communication links to any number of aircraft in formation flight, a aircraft communications bus protocols and message packet structure that provides exchange of information from any number of aircraft in formation, encrypting a communications exchange between any number of aircraft in formation flight, providing a computed formation zone (FZ) that provides the speed (IAS), position, and altitude selecting both formation flight pattern and spatial clearance between any number of aircraft in formation flight;

providing real-time display of the positions of any number of aircraft in formation flight;

providing a buffer zone with a relative formation point (RFP) for each aircraft in formation flight;

polling all aircraft in formation flight for positional information, providing flight guidance including autopilot inputs to any number of aircraft in formation, providing a dampening of the flight profile to any number of aircraft in formation.

* * * * *